(No Model.)
W. M. FOWLER.
MULTIPLE FILTER.
No. 565,972. Patented Aug. 18, 1896.
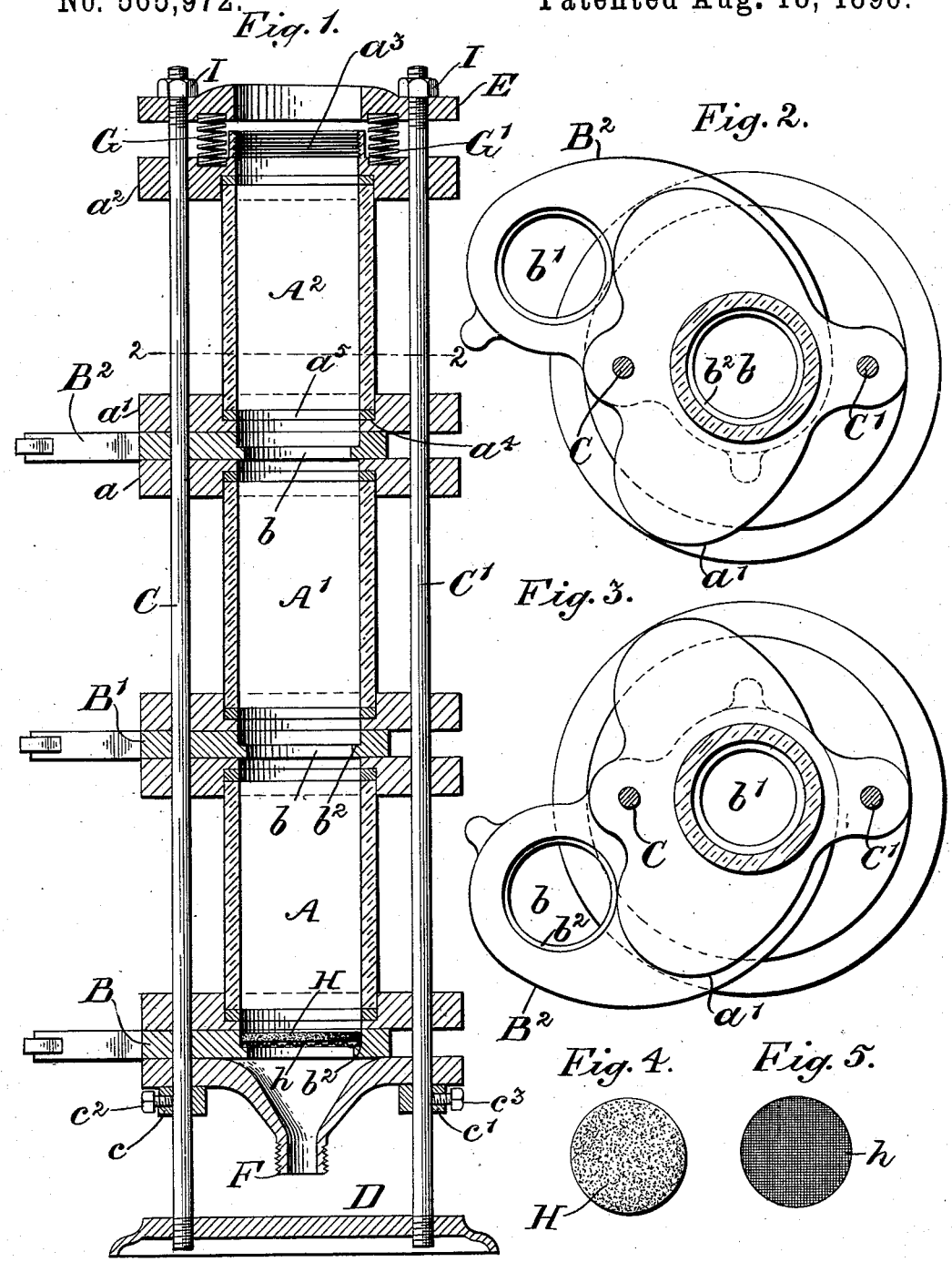
Witnesses
M. E. Fletcher
Jno. Haynes
Inventor
Wm. M. Fowler
by attorneys
Brown & Seward

UNITED STATES PATENT OFFICE.

WILLIAM MILES FOWLER, OF STAMFORD, CONNECTICUT.

MULTIPLE FILTER.

SPECIFICATION forming part of Letters Patent No. 565,972, dated August 18, 1896.

Application filed March 28, 1896. Serial No. 585,188. (No model.)

*To all whom it may concern:*

Be it known that I, WILLIAM MILES FOWLER, of Stamford, in the county of Fairfield and State of Connecticut, have invented a new and useful Improvement in Multiple Filters, of which the following is a specification.

My invention relates to an improvement in multiple filters, in which provision is made for increasing and diminishing the number of filtering-laminæ and renewing them or changing them at pleasure, without materially interrupting the filtering operation.

A practical embodiment of my invention is represented in the accompanying drawings, in which—

Figure 1 is a view in vertical section of a column or stack of filter-sections as set up for use. Fig. 2 is a transverse section in the plane of line 2 2 of Fig. 1, showing the laterally-movable plate which carries the filtering material in position to bring one of its openings in alinement with the interior of the column. Fig. 3 is a similar view showing the movable plate in position with another of its openings in alinement with the interior of the column; and Figs. 4 and 5 represent, respectively, a disk of fibrous material and a screen such as may be conveniently used as filtering material in the openings in the movable plates.

The column may consist of one or more tubular sections, circular or other shape in cross-section and having interposed between the bottom of one and the top of the next succeeding filter-section, or discharge-funnel below, a laterally-movable plate provided with one or more openings which may by the movement of the plates be brought into or out of adjustment with the interior of the column without disturbing the relation of the different filter-sections to one another or to the discharge-funnel.

In the form in which I have illustrated my invention I have shown a column of three filter-sections and a discharge-funnel below the bottom section.

The body portions of the filter-sections are preferably, though not necessarily, formed of glass and are denoted by $A$ $A'$ $A^2$. They are shown as circular in cross-section and their opposite ends are seated liquid-tight in top and bottom plates $a$ $a'$, which are quite similar in construction, with the exception that the top plate $a^2$ of the upper section $A^2$ is conveniently provided with a screw-thread $a^3$ for the attachment thereto of the end of a supply pipe or hose when the filter is employed in connection with a continuous supply of liquid to be filtered. The sides of the top and bottom plates toward the sections $A$ $A'$, &c., are provided with an annular sunk shoulder $a^4$ around the opening therethrough for seating the ends of the sections, which may be conveniently made liquid-tight by means of gaskets $a^5$ of rubber or other suitable material. The opposite sides of said plates, with the exception of the top or connection plate $a^2$, are provided with ground faces to form a liquid-tight joint with the opposite faces of the movable plates $B$ $B'$, &c. In the present instance I have shown three movable plates $B$ $B'$ $B^2$, one between the bottom of the lowermost filter-section and the discharge-funnel and one between each of the two consecutive sections $A$ $A'$ and $A'$ $A^2$. The column is conveniently supported by uprights, two or three in number, in the present case two, (denoted by $C$ $C'$,) fixed at their lower ends in a base $D$ and connected at their upper ends by a cross-head $E$.

The top and bottom plates of the several sections have a vertically-sliding engagement with the uprights, and the movable plates $B$, $B'$, and $B^2$ are engaged with one of the uprights only and permitted to move up and down together with the plates $a$ $a'$, and at the same time to swing laterally about the upright as a pivot.

The discharge-funnel $F$ is held at the desired height on the uprights by collars $c$ $c'$, clamped to the uprights by set-screws $c^2 c^3$, and springs $G$ $G'$, inserted between the cross-head $E$ and the top plate $a^2$, serve to press the several sections endwise to keep the joints tight. The movable plates $B$ $B'$ $B^2$ are, as shown, each provided with two openings $b$ $b'$, preferably of a diameter about equal to that of the interior of the tubular sections $A$ $A'$, &c., spaced apart such a distance as to permit an opening to become entirely inclosed between the extended wings of the top and bottom plates $a$ $a'$ before opening communication with the interior of the column when being swung into alinement and before opening communication with the outside air when being swung out of alinement.

The openings $b$ $b'$ are conveniently provided with annular retaining-shoulders $b^2$ at a suitable distance below the upper surfaces to form a support for the filtering material, which may consist of a disk of felt H or other suitable filtering material supported upon a disk of gauze $h$, both fitted to said openings, so as to force the liquid to pass through them in passing from one filter-section to another.

The cross-head E may be adjusted toward the base D or supporting-collars $c$ $c'$ to increase the tension of the springs G G' to tighten the joints by means of nuts I on the screw-threaded ends of the uprights.

When the filter is in use, the filtering material may be renewed, exchanged, or entirely removed from one or more of the exposed openings in the movable plates and the plate or plates may then be swung into position to bring that exposed opening or those exposed openings into alinement with the column, bringing at the same time the opening or openings which were previously in alinement out into exposed position, where their filtering material may be renewed, exchanged, or removed. This admits of reducing the number of laminæ of filtering material at pleasure, and of changing the density of or cleaning the filtering material, while the filter is practically uninterrupted in its operation.

What I claim is—

1. The combination with a tubular filter-section, of a plate arranged to move laterally of the tubular section and provided with an opening for the reception of filtering material, the movement of the said plate being sufficient to carry the opening therein to and from an exposed position, from and to a position in alinement with the interior of the filter-section, while maintaining a liquid-tight joint with the wall of said section, substantially as set forth.

2. The combination with a plurality of superposed filter-sections, of a plurality of interposed movable plates having liquid-tight joints with the said sections, the said movable plates being each provided with a plurality of openings for the reception of filtering material, substantially as set forth.

3. The filter, comprising a plurality of superposed filter-sections and swinging plates interposed between the ends of consecutive sections, the said swinging plates being each provided with a plurality of openings for the reception of filtering material, substantially as set forth.

4. The filter, comprising a plurality of superposed filter-sections, swinging plates interposed between the sections and provided with openings for the reception of filtering material and springs for holding the filter-sections in close contact with the interposed plates, substantially as set forth.

WILLIAM MILES FOWLER.

Witnesses:
FREDK. HAYNES,
GEORGE BARREY, Jr.